(12) United States Patent
Hirata et al.

(10) Patent No.: US 7,553,025 B2
(45) Date of Patent: Jun. 30, 2009

(54) PROJECTION TYPE IMAGE DISPLAY APPARATUS, AND OPTICAL UNIT AND POLARIZATION SPLITTING UNIT EACH USED FOR THE APPARATUS

(75) Inventors: Koji Hirata, Yokohama (JP); Masahiko Yatsu, Fujisawa (JP)

(73) Assignee: Hitachi, Ltd., Tokyo (JP)

( * ) Notice: Subject to any disclaimer, the term of this patent is extended or adjusted under 35 U.S.C. 154(b) by 454 days.

(21) Appl. No.: 11/407,044

(22) Filed: Apr. 20, 2006

(65) Prior Publication Data
US 2006/0238715 A1     Oct. 26, 2006

(30) Foreign Application Priority Data
Apr. 21, 2005    (JP) .............................. 2005-123452

(51) Int. Cl.
*G03B 21/14*   (2006.01)
*G03B 21/28*   (2006.01)
*G02B 17/04*   (2006.01)
*G02B 27/12*   (2006.01)
*G02B 27/28*   (2006.01)
*H04N 9/07*    (2006.01)

(52) U.S. Cl. .............................. 353/20; 353/84; 353/81; 359/566; 359/438; 359/496; 359/640; 359/490; 359/634; 348/338; 348/339

(58) Field of Classification Search ............... 353/20, 353/84, 81; 359/566, 438, 496, 640, 490, 359/634; 348/338, 339
See application file for complete search history.

(56) References Cited

U.S. PATENT DOCUMENTS

| | | | |
|---|---|---|---|
| 7,315,418 B2* | 1/2008 | DiZio et al. | 359/500 |
| 2003/0081317 A1* | 5/2003 | Katsumata et al. | 359/566 |
| 2005/0213043 A1* | 9/2005 | Nakashima et al. | 353/20 |

FOREIGN PATENT DOCUMENTS

| | | |
|---|---|---|
| JP | 2001-142028 | 5/2001 |
| JP | 2003-195223 | 7/2003 |

* cited by examiner

*Primary Examiner*—Diane I Lee
*Assistant Examiner*—Magda Cruz
(74) *Attorney, Agent, or Firm*—Antonelli, Terry, Stout & Kraus, LLP.

(57) ABSTRACT

A polarization splitting section has a structure in that a polarization splitting layer is formed of a light reflecting grid member which is arranged in a grid-shaped pattern on an optically-transparent substrate, and an optically-transparent medium is filled between the grid member and the substrate in contact with the grid member surface and the substrate surface, and the grid member and the filled optically-transparent medium are bonded to the substrate with another adhesive agent or tackiness agent formed of an optically-transparent medium interposed. The polarization splitting layer is partly protruded externally from the surfaces of prism materials.

17 Claims, 7 Drawing Sheets

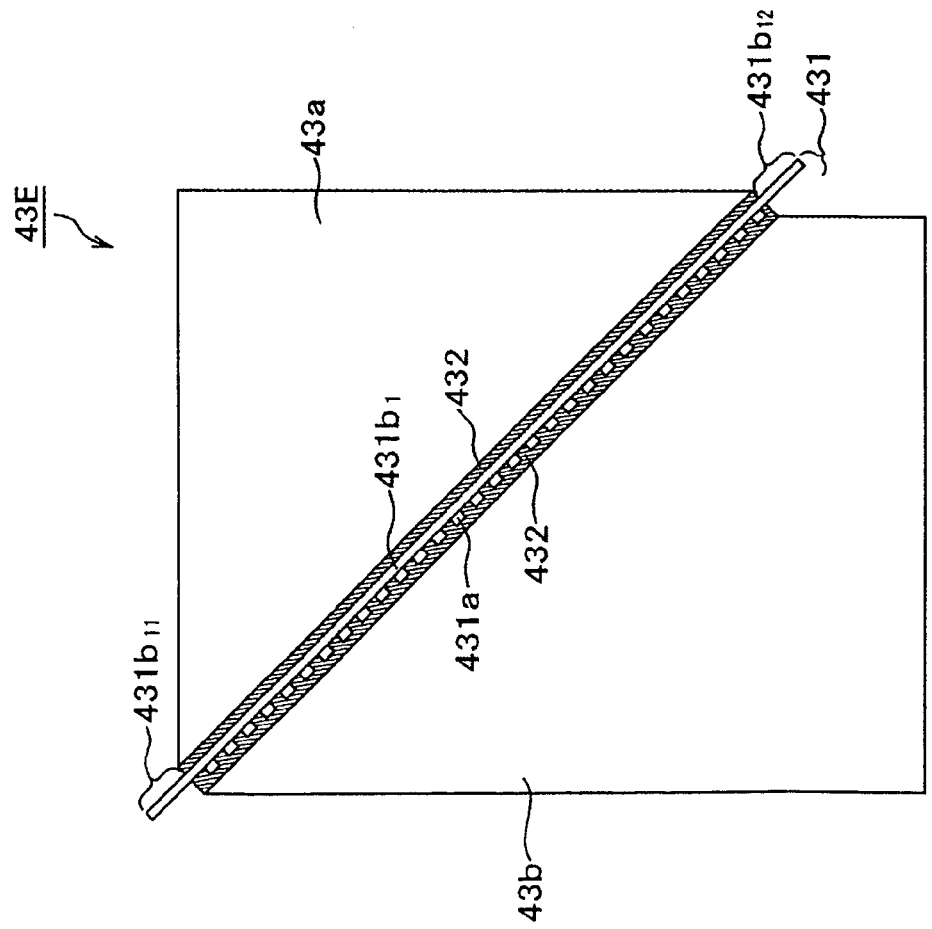

PROJECTION TYPE IMAGE DISPLAY APPARATUS, AND OPTICAL UNIT AND POLARIZATION SPLITTING UNIT EACH USED FOR THE APPARATUS

INCORPORATION BY REFERENCE

The present application claims priority from Japanese application JP2005-123452 filed on Apr. 21, 2005, the content of which is hereby incorporated by reference into this application.

BACKGROUND OF THE INVENTION

The present invention relates to a projection type image display apparatus, and more particularly to polarization splitting technology for polarization splitting of light emitted to a light valve such as a liquid crystal panel and light modulated by the light valve.

Technology related to the present invention is described in, for example, JP-A-2001-142028, JP-A-2003-131212 and JP-A-2003-195223 (corresponding to US 2003/0081317).

Japanese Patent Application Laid-Open Publication No. 2001-142028 describes as polarization splitting means a PBS prism having a polarized beam splitter (hereinafter referred to as "PBS") which is a dielectric multi-layer film formed between the interfaces of two rectangular prisms.

Japanese Patent Application Laid-Open Publication No. 2003-131212 describes a wire grid type polarization splitting element having a diffraction grid provided by forming wire grids (e.g., metallic wire grids) on a glass substrate at a prescribed pitch (forming cycle).

Japanese Patent Application Laid-Open Publication No. 2003-195223 indicates a prism having polarization splitting characteristics configured as described below. Specifically, a diffraction grid is sandwiched between a pair of diffraction grid base materials, and a prism base material is bonded to the surface, which is in contact with the diffraction grid, of each of the individual diffraction grid base materials and to the opposite surface with an adhesive layer interposed. And, a diffraction grid medium which has substantially the same refractive index as that of a pair of prism base materials is filled in the space formed by the diffraction grid and the diffraction grid base material.

SUMMARY OF THE INVENTION

The PBS prism described in the Japanese Patent Application Laid-Open Publication No. 2001-142028 has a possibility that when oblique light, which is not parallel to the surface (main incidence plane) formed by an optical axis and a normal line of a PBS film surface, enters, light leaks and an extinction ratio lowers, and the contrast is decreased.

And, the wire grid type polarization splitting element described in the Japanese Patent Application Laid-Open Publication No. 2003-131212 has a tendency that brightness lowers because of the reflection of light on the glass substrate at the interface between the air layer and the glass substrate surface, and imaging performance of a projection lens lowers because of astigmatism. Besides, the optical distance from the projection lens to the light valve increases, and it becomes difficult to correct the aberration of the projection lens.

And, the Japanese Patent Application Laid-Open Publication No. 2003-195223 specifies in order to decrease the astigmatism that the relationship of refractive index is substantially the same between the pair of prism base materials (the pair of prism parts) and the filling material of the diffraction grid (grid type polarization part). But, the prism base materials and the diffraction grid are not adjacent to each other directly but have an adhesive layer between them, and there is no description or suggestion about the refractive index of the adhesive layer.

It is because the above literature aims to decrease the astigmatism.

Specifically, it is necessary to make the refractive index of the filling material (diffraction grid medium) of the diffraction grid closer to that of the prism base material in order to decrease the astigmatism. But, reflection occurs on the interface between the prism base material and the diffraction grid depending on the refractive index of the filling material of the diffraction grid. If an amount of reflection on the interface is large, P-polarization, which normally passes through, is partly reflected at the diffraction grid (grid type polarization part) and mixed with S-polarization, resulting in a problem that the contrast performance is deteriorated. This problem is not indicated in the above literature.

None of the above literatures suggests measures against a temperature increase of the polarization splitting section and the like. In other words, if the temperature of the polarization splitting section or the like increases, a stress is produced to cause disturbance in polarization characteristics, resulting in deterioration of the polarization splitting property.

The present invention has been made in view of the above related art and has an object to provide a projection type image display apparatus that the reflection of light at a polarization splitting section, astigmatism and an optical distance from a projection lens to a light valve can be suppressed from increasing.

The present invention has an object to provide a projection type image display apparatus that the problems of the above related art are remedied, and an optical unit and a polarization splitting unit to be used for it.

The present invention has another object to provide a projection type image display apparatus capable of showing a bright and high quality image, and an optical unit and a polarization splitting unit used for it.

To remedy the above problems, according to the present invention, the polarization splitting section which performs polarization splitting of incident light has a pair of prism materials and a polarization splitting layer which is sandwiched between the pair of prism materials; the polarization splitting layer is formed of a light reflecting grid member which is arranged in a grid-shaped pattern on an optically-transparent substrate; an optically-transparent medium is filled between the grid member and the substrate in contact with the grid member surface and the substrate surface; and the grid member and the filled optically-transparent medium are bonded to the substrate with another adhesive agent or tackiness agent formed of an optically-transparent medium interposed.

The refractive index of the adhesive agent or tackiness agent is substantially same as the refractive index of the grid member and the filled optically-transparent medium.

It is determined that when it is assumed that the refractive index of the filled optically-transparent medium is $n_1$ and the refractive index of the substrate is $n_2$, $\{(n_2-n_1)/(n_2+n_1)\}^2 \leq 0.003$ is satisfied. Thus, an outstanding polarization splitting property can be obtained. If this value is 0.001 or less, a more outstanding polarization splitting property can be obtained. Thus, the filling material and the adhesive agent or tackiness agent are specified to a material having the refractive index in a prescribed range, so that adjacent interface reflection can be decreased. If an amount of reflection on the interface is large, the P-polarization which normally passes through is partly reflected at the polarization splitting section and mixed with the S-polarization, causing a problem that the contrast performance is deteriorated. But, the present invention can prevent it.

And, the polarization splitting layer is configured to partly protrude externally from the surfaces of the prism materials. The part protruded from the surfaces can be exposed to cooling air, so that a cooling efficiency of the whole of a polarization splitting unit and the polarization splitting layer can be improved. As a result, the polarization splitting property can be prevented from deteriorating.

And, as a projection type image display apparatus that emits the light from a light source to the light valve, forms an optical image according to picture signals and enlarges and projects it or an optical unit used for it, it is configured such that the light emitted to the light valve and the light modulated by the light valve are undergone the polarization splitting by the polarization splitting unit, the lights undergone the polarization splitting are color-synthesized by a color-synthesizing means, and the color-synthesized light beam is enlarged and projected onto a screen or the like by a projection lens unit.

According to the present invention, the reflection of light and astigmatism in the polarization splitting section can be suppressed by the projection type image display technology, thereby bright and high-quality pictures can be obtained with a decrease in contrast suppressed. Besides, the optical distance from the projection lens to the light valve can be decreased, so that the correction of aberration can be facilitated, and a low-cost projection lens can be provided.

Other objects, features and advantages of the invention will become apparent from the following description of the embodiments of the invention taken in conjunction with the accompanying drawings.

BRIEF DESCRIPTION OF THE DRAWINGS

FIGS. 7A and 7B are diagrams showing a fifth embodiment of the polarization splitting unit.

DETAILED DESCRIPTION OF THE EMBODIMENTS

Figure 1:
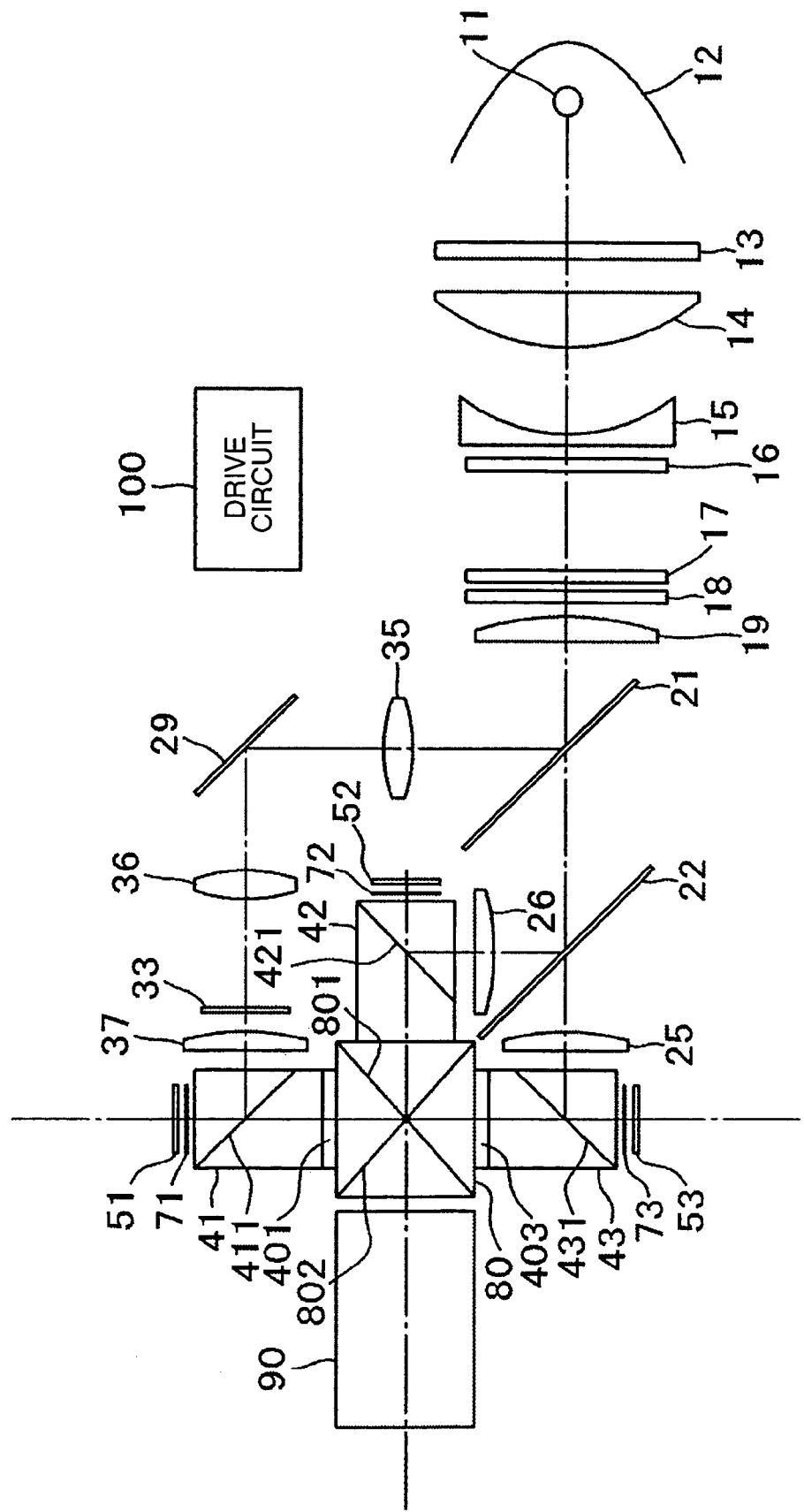
FIG. 1 is a diagram showing a structure example of a projection type image display apparatus according to a first embodiment of the invention.

Embodiments of the invention will be described with reference to the accompanying drawings. Like reference numerals are allotted to identical structure and function component elements throughout the drawings.

Figure 2:
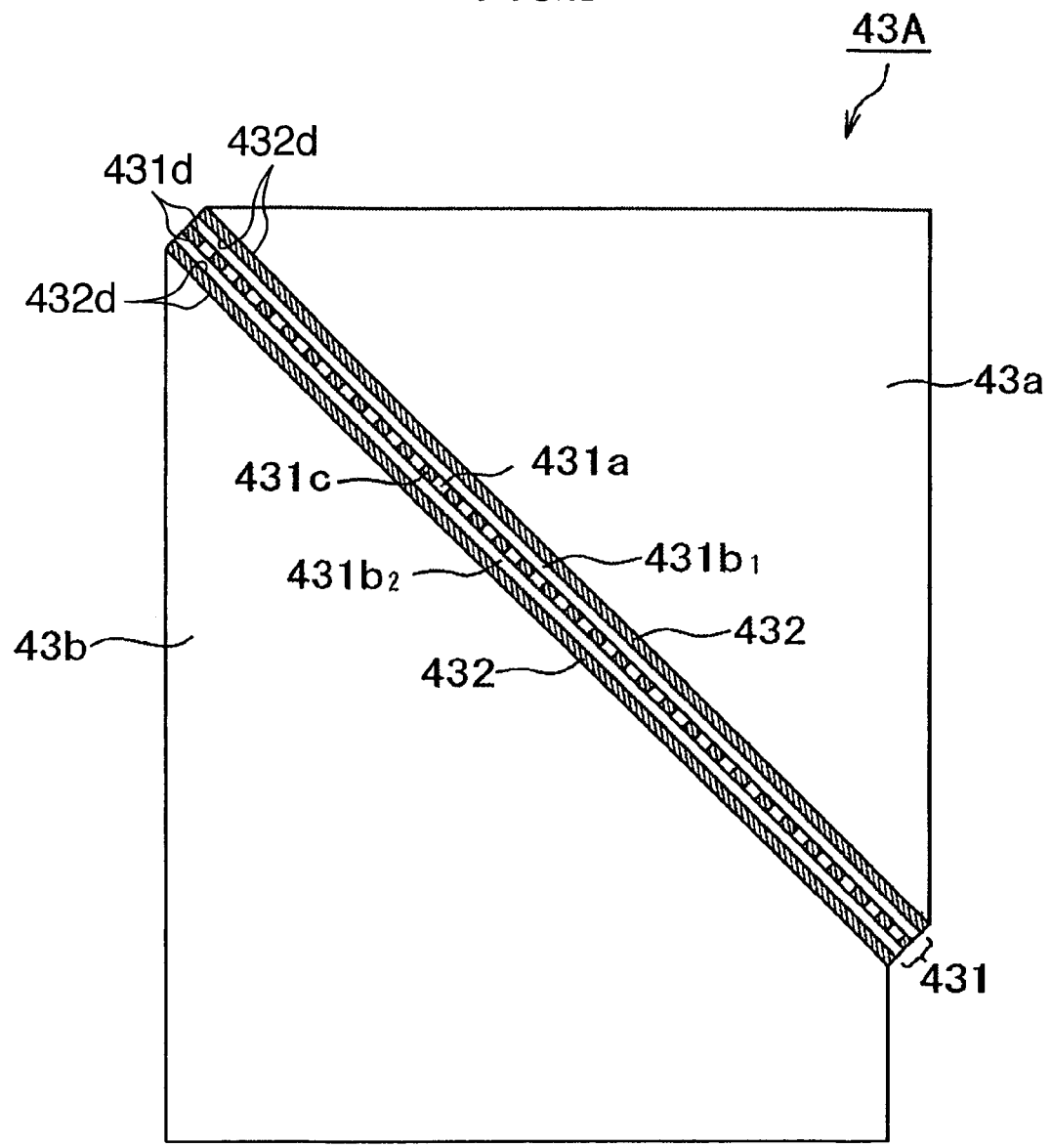
FIG. 2 is a diagram showing a structure example of a polarization splitting section of the projection type image display apparatus shown in FIG. 1.
Figure 3:
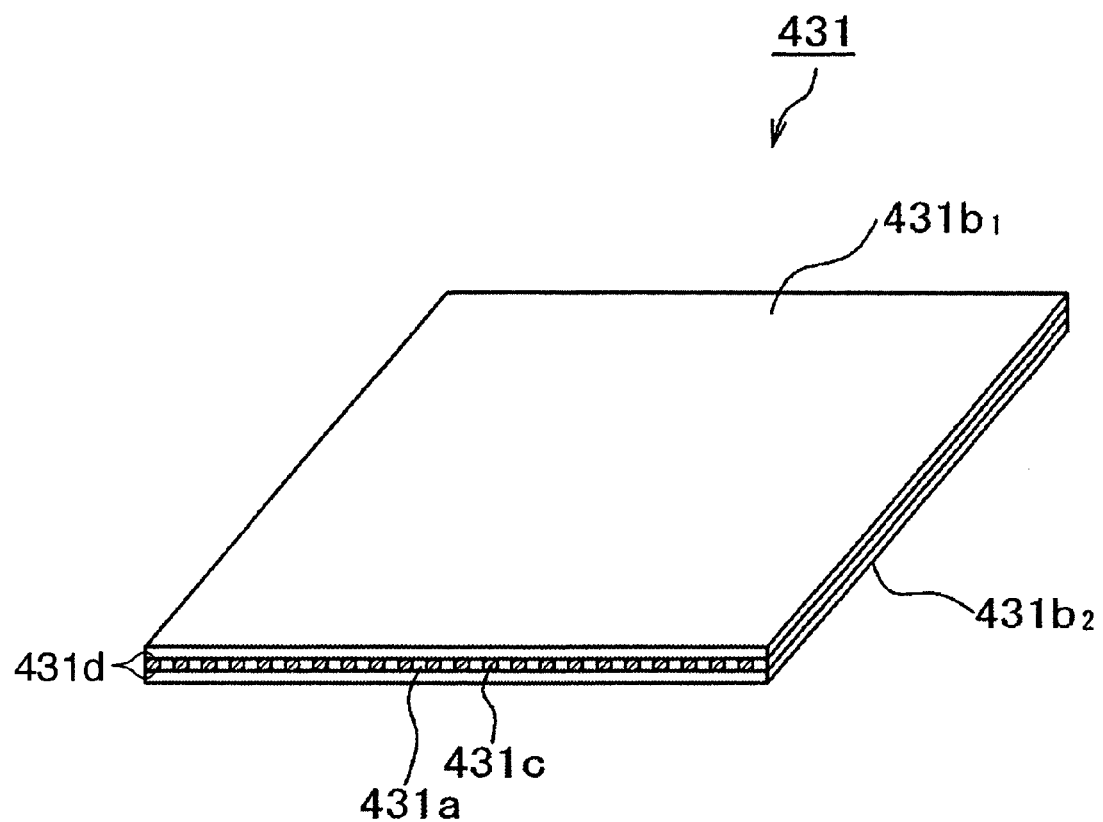
FIG. 3 is a diagram showing a polarization splitting layer of the polarization splitting section shown in FIG. 2.
Figure 4:
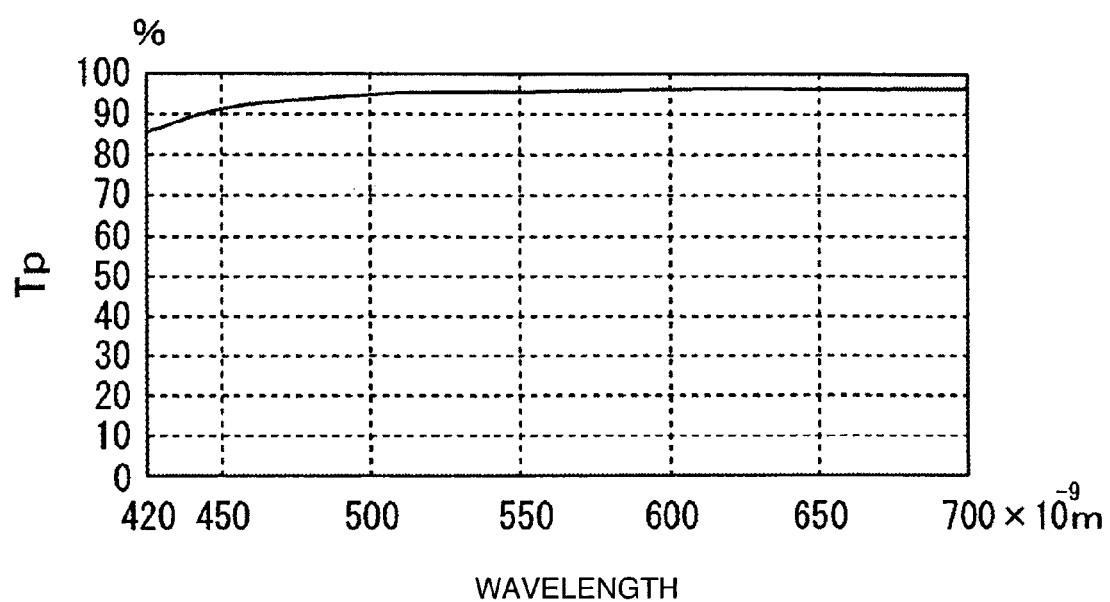
FIG. 4 is a diagram showing a light transmittance characteristic of the polarization splitting layer shown in FIG. 3.

FIG. 1 through FIG. 4 are explanatory diagrams of a projection type image display apparatus as a first embodiment of the invention. The first embodiment is an example of a liquid crystal projector using a reflection-type liquid crystal panel as a light valve. FIG. 1 is a diagram of a structure example of the projection type image display apparatus as the first embodiment, FIG. 2 is a diagram of a structure example of a polarization splitting section in the projection type image display apparatus of FIG. 1, FIG. 3 is a diagram showing a polarization splitting layer of the polarization splitting section shown in FIG. 2, and FIG. 4 is a light transmittance characteristic diagram of the polarization splitting layer of FIG. 3.

In FIG. 1, 11 is a light source, 12 is a reflector having a shape of a parabolic reflection surface, 13 is an ultraviolet cut filter for removal of ultraviolet rays, 14 and 15 are collimator lenses for concentration of light and making parallel light beams, 16 is a first multilens array which is comprised of plural rectangular lens cells and forms plural secondary light source images, 17 is a second multilens array which is comprised of plural rectangular lens cells and forms individual lens cell images of the first multilens array 16, 18 is a polarization conversion element as a polarization converter which aligns polarization directions of light from the light source and forms P-polarization light or S-polarization light, 19, 25, 26 and 37 are condenser lenses, 21 is a red reflecting dichroic mirror as a color separator, 22 is a green reflecting dichroic mirror as a color separator, 35 is a relay lens, 36 is a field lens, 29 is a total reflection mirror, 33 is an infrared ray absorption filter for absorbing infrared rays in red light, 51 is a red light reflection-type liquid crystal panel as a light valve for red light, 52 is a green light reflection-type liquid crystal panel as a light valve for green light, 53 is a blue light reflection-type liquid crystal panel as a light valve for blue light, 71 is a red light quarter wave plate for aligning the polarization directions of transmissive red light, 72 is a similar green light quarter wave plate, 73 is a similar blue light quarter wave plate, 41 is a red light polarization splitting section for performing polarization splitting of incident light, 42 is a similar green light polarization splitting section, 43 is a similar blue light polarization splitting section, 401 is a red light half wave plate, and 403 is a blue light half wave plate.

In this embodiment, it is assumed that the blue light polarization splitting section 43 has the polarization splitting surface, which performs polarization splitting of light by diffraction based on a grid structure, between prism materials, and the polarization splitting surface is formed between the prism materials in contact with an optically-transparent medium. And, it is assumed that the red light polarization splitting section 41 and the green light polarization splitting section 42 have, for example, a conventional polarization splitting structure using an organic multi-layer film. 411 is a red light polarization splitting layer which configures a red light polarization splitting surface within the polarization splitting section 41, 421 is a green light polarization splitting layer which configures a green light polarization splitting surface within the polarization splitting section 42, and 431 is a blue light polarization splitting layer which configures a blue light polarization splitting surface by a grid structure within the polarization splitting section 43. The red light polarization splitting section 41 performs polarization splitting of light which is emitted to the red light reflection-type liquid crystal panel 51 and light which is modulated by the reflection-type liquid crystal panel 51 by the polarization splitting surface of the red light polarization splitting layer 411, the green light polarization splitting section 42 performs polarization splitting of light which is emitted to the green light reflection-type liquid crystal panel 52 and light which is modulated by the reflection-type liquid crystal panel 52 by the polarization splitting surface of the green light polarization splitting layer 421, and the blue light polarization splitting section 43 performs polarization splitting of light which is emitted to the blue light reflection-type liquid crystal panel 53 and light which is modulated by the reflection-type liquid crystal panel 53 by the polarization splitting surface of the blue light polarization splitting layer 431. And, 80 is a cross dichroic prism as a color-synthesizing part, 801, 802 each are dichroic surfaces of the cross dichroic prism 80, 90 is a projection lens unit for enlarging and projecting the color-synthesized light to a screen or the like, and 100 is a drive circuit which drives each of the reflection-type liquid crystal panels 51, 52, 53 according to picture signals.

In the structure of FIG. 1, the light output from the light source 11 is reflected by the reflector 12 having a parabolic reflection surface shape to enter the ultraviolet cut filter 13. The light, which has ultraviolet rays removed by the ultraviolet cut filter 13, is made into parallel light beams by the collimator lenses 14, 15, which are then passed through the first array lens 16 and the second array lens 17 to form plural secondary light source images. The imaging light is entered into the polarization converting element 18 and divided into P-polarization light and S-polarization light of white light by a polarization beam splitter (not shown) within the polarization converting element 18. Similarly, the divided P-polarization light is turned its polarization directions so to be an S-polarization light by a half wave plate (not shown) within the polarization converting element 18, combined with the S-polarization light which is divided by the polarization beam splitter, passed through the condenser lens 19 and entered into the red reflecting dichroic mirror 21. At the red reflecting dichroic mirror 21, S-polarization light of red light in the S-polarization light of the white light is reflected by its color separation film, and S-polarization light of green light+blue light is transmitted. The reflected S-polarization light of the red light is reflected by the total reflection mirror 29 through the relay lens 35, passed through the field lens 36, the infrared ray absorption filter 33 and the condenser lens 37 and entered into the red light polarization splitting section 41.

Within the red light polarization splitting section 41, the S-polarization light of the red light is reflected while being undergone polarization splitting by the polarization splitting surface of the organic multi-layers of the red light polarization splitting layer 411. The reflected S-polarization light of the red light is aligned the polarization directions by the red light quarter wave plate 71 and emitted to the red light reflection-type liquid crystal panel 51. The emitted S-polarization light of the red light is modulated and reflected according to the picture signals by the reflection-type liquid crystal panel 51 being driven by the drive circuit 100 and then output as P-polarization light of red light. The output P-polarization light of the red light passes through the quarter wave plate 71 and then enters the polarization splitting section 41 again. Within the red light polarization splitting section 41, the P-polarization light of the red light passes through the polarization splitting surface of the red light polarization splitting layer 411. The transmitted P-polarization light of the red light is output from the polarization splitting section 41 through the prism material part within the polarization splitting section 41, converted into S-polarization light while passing through the half wave plate 401 and entered into the cross dichroic prism 80. Within the cross dichroic prism 80, the S-polarization light of the red light is reflected on the dichroic surface 801.

Meanwhile, the S-polarization light of the green light+blue light which has passed through the red reflecting dichroic mirror 21 enters the green reflecting dichroic mirror 22. At the green reflecting dichroic mirror 22, the green light is reflected on its color separation film, and the blue light passes through it. The reflected green light is passed through the condenser lens 26 and entered into the green light polarization splitting section 42. Within the green light polarization splitting section 42, it is reflected while being undergone polarization splitting on the polarization splitting surface of the organic multi-layers of the green light polarization splitting layer 421. The S-polarization light of the reflected green light is aligned the polarization directions by the green light quarter wave plate 72 and emitted to the green light reflection-type liquid crystal panel 52. On the reflection-type liquid crystal panel 52 which is driven by the drive circuit 100, the emitted S-polarization light of the green light is modulated and also reflected according to the picture signals and output as the P-polarization light of the green light. The output P-polarization light of the green light is passed through the quarter wave plate 72 and then entered into the polarization splitting section 42 again. Within the green light polarization splitting section 42, the P-polarization light of the green light is passed through the polarization splitting surface of the green light polarization splitting layer 421. The transmitted P-polarization light of the green light is output from the polarization splitting section 42 via the prism material part within the polarization splitting section 42 and entered into the cross dichroic prism 80. Within the cross dichroic prism 80, the P-polarization light of the green light passes through the dichroic surfaces 801, 802.

And, the S-polarization light of the blue light, which has passed through the green reflecting dichroic mirror 22, is passed through the condenser lens 25 and entered into the blue light polarization splitting section 43. Within the blue light polarization splitting section 43, the S-polarization light of the blue light is reflected on the polarization splitting surface of the blue light polarization splitting layer 431 while being undergone the polarization splitting by diffraction on the basis of the grid structure. The reflected S-polarized light of the blue light is aligned the polarization directions by the blue light quarter wave plate 73 and emitted to the blue light reflection-type liquid crystal panel 53. On the reflection-type liquid crystal panel 53 which is driven by the drive circuit 100, the emitted S-polarization light of the blue light is modulated and reflected according to the picture signals and output as the P-polarization light of the blue light. The output P-polarization light of the blue light is passed through the quarter wave plate 73 and entered into the polarization splitting section 43 again. Within the blue light polarization splitting section 43, the P-polarization light of the blue light passes through the polarization splitting surface of the blue light polarization splitting layer 431. The transmitted P-polarization light of the blue light is converted into the S-polarization light while being passed through the half wave plate 403, output from the polarization splitting section 43 via the prism material part in the polarization splitting section 43, and entered into the cross dichroic prism 80. Within the cross dichroic prism 80, the S-polarization light of the blue light is reflected on the dichroic surface 802.

Within the cross dichroic prism 80, the S-polarization light of the red light output from the polarization splitting section 41, the P-polarization light of the green light output from the polarization splitting section 42, and the S-polarization light of the blue light output from the polarization splitting section 43 are mutually color-synthesized and output as optical image light of white light. The output optical image light is entered into the projection lens unit (projection lens unit) 90 and enlarged and projected onto a screen or the like to display images. At this time, to decrease uneven reflection on the screen or the like, the quarter wave plate may be disposed on the output surface of the cross dichroic prism 80 to make all color lights of blue, red and green into circular polarization.

Like reference numerals as those used in FIG. 1 are allotted to the component elements of FIG. 1 to be used in the descriptions below.

FIG. 2 is a diagram of a structure example of the polarization splitting unit which configures the blue light polarization splitting section 43 of the projection type image display apparatus of FIG. 1. In this structure example, the blue light polarization splitting section 43 has the polarization splitting surface formed of a light reflecting grid member (wire grid) which is arranged in a grid-shaped pattern on the optically-transparent substrate, and an optically-transparent medium is filled between the grid member and the substrate in contact with the grid member surface and the substrate surface.

In FIG. 2, 43A is a blue light polarization splitting unit, 43a, 43b are prism materials, 431 is a polarization splitting layer, 431a is a light reflecting grid member (wire grid) which is arranged in a grid-shaped pattern, and $431b_1$, $431b_2$ each are optically-transparent substrates which have the grid member 431a disposed on a plane surface. 431c is an optically-transparent medium which is filled between the light reflecting grid member 431a and the substrates $431b_1$, $431b_2$ in contact with the surface of the grid member 431a and the surfaces of the optically-transparent substrates $431b_1$, $431b_2$. 432 is an optically-transparent medium which is disposed between the substrate $431b_1$ and the prism material 43a and between the substrate $431b_2$ and the prism material 43b. The polarization splitting layer 431 is comprised of the substrates $431b_1$, $431b_2$, the light reflecting grid member 431a, and the optically-transparent medium 431c. The medium 431c and the medium 432 may be of the same material or a different material.

In the first embodiment, an adhesive agent or a tackiness agent of the same material is preferably used for each of the medium 431c and the medium 432. In other words, the medium 431c is fixed with an adhesive or tackiness agent 431d between it and the substrate $431b_1$ and between it and the substrate $431b_2$. And, on one side, the medium 432 is fixed with a tackiness agent 432d between it and the substrate $431b_1$ and between it and the prism material 43a. On the other side, the medium 432 is fixed with an adhesive or tackiness agent 432d between it and the substrate $431b_2$ and between it and the prism material 43b.

FIG. 3 is a perspective view of the polarization splitting layer 431. The light reflecting grid member 431a is arranged in a grid-shaped pattern between two optically-transparent substrates $431b_1$ and $431b_2$, and the optically-transparent medium 431c is filled in contact with the surface of the grid member 431a and the surfaces of the optically-transparent substrates $431b_1$, $431b_2$. The medium 431c and the substrates $431b_1$, $431b_2$ desirably have an equal refractive index in view of the light polarization splitting processing. In other words, when it is assumed that the refractive index of the medium 431c is $n_1$, the refractive index of the substrates $431b_1$, $431b_2$ is $n_2$, and $\{(n_2-n_1)/(n_2+n_1)\}^2$ is in a range of, for example, 0.003 or less, there is obtained substantially the same polarization splitting performance as that in a case that the refractive index $n_1$ and the refractive index $n_2$ are mutually equal. If it is 0.001 or less, a more outstanding polarization splitting property can be obtained. As the substrates $431b_1$, $431b_2$, for example, a glass substrate, a quartz substrate, a sapphire substrate or a magnesia oxide (MgO) substrate is used. The quartz substrate, the sapphire substrate or the magnesia oxide (MgO) substrate has high resistance to heat and good heat conductance in comparison with the glass substrate. Especially, the magnesia oxide (MgO) substrate does not require the axis adjustment with respect to an optical axis.

And, it is also desirable in view of the light polarization splitting processing that the adhesive or tackiness agent 431d has the same refractive index as that of each of the medium 431c and the substrates $431b_1$, $431b_2$. In other words, when it is assumed that the refractive index of the adhesive or tackiness agent 431d is $n_3$, and $\{(n_3-n_1)/(n_3+n_1)\}^2$ is in a range of, for example, 0.003 or less, there is obtained substantially the same polarization splitting performance as that in a case that the refractive index $n_1$ and the refractive index $n_3$ are mutually equal. And, if it is 0.001 or less, a more outstanding polarization splitting property can be obtained.

Similarly, if $\{(n_3-n_2)/(n_3+n_2)\}^2$ is in a range of, for example, 0.003 or less, substantially the same polarization splitting property as that when the refractive index $n_2$ and the refractive index $n_3$ are mutually equal can be obtained. And, if it is 0.001 or less, a more outstanding polarization splitting property can be obtained.

Similarly, it is desirable in view of the light polarization splitting processing that the adhesive or tackiness agent 432d has the same refractive index as those of the substrates $431b_1$, $431b_2$. Specifically, when the refractive index of the adhesive or tackiness agent 432d is $n_4$, and $\{(n_4-n_2)/(n_4+n_2)\}^2$ is in a range of, for example, 0.003 or less, substantially the same polarization splitting performance as that when the refractive index $n_2$ and the refractive index $n_3$ are mutually equal can be obtained. And, if it is 0.001 or less, a more outstanding polarization splitting property can be obtained. It may also be configured such that the adhesive or tackiness agent 432d and the adhesive or tackiness agent 431d are formed of the same material and have the same refractive index.

FIG. 4 is a diagram showing a light transmittance characteristic of the polarization splitting layer 431 of FIG. 3.

It is seen from the characteristic of FIG. 4 that the light transmittance of the polarization splitting layer 431 is more than about 95% for blue light having a wavelength band of $600 \times 10^{-9}$ m or more, and about 95% or more for green light having a wavelength band of $500 \times 10^{-9}$ m or more. Therefore, a loss of blue light is less than 5% at the time of the polarization splitting processing, and it is a level which is practically not a problem at all.

According to the projection type image display apparatus of the first embodiment, the reflection of light and astigmatism can be suppressed, thereby bright and high-quality pictures can be obtained with a decrease in contrast suppressed. Besides, the optical distance between the projection lens and the light valve can be decreased, so that aberration correction of the projection lens is facilitated, and a cost for the projection lens can be decreased.

In the projection type image display apparatus of the first embodiment, it is configured that only the blue light polarization splitting section 43 performs polarization splitting of light by diffraction based on the grid structure, but the invention is not limited to it but may have a structure that, for example, the green light polarization splitting section 42 also performs polarization splitting of light by diffraction based on the grid structure in conjunction with the blue light polarization splitting section 43.

And, the blue light polarization splitting section 43, the green light polarization splitting section 42 and the red light polarization splitting section 41 each may have a structure to perform polarization splitting of light by the diffraction based on the grid structure. And, the polarization converting element 18 of the projection type image display apparatus of the first embodiment makes the separated P-polarization light to the S-polarization light within it and outputs the S-polarization light of the white light, but may be configured conversely to make the separated S-polarization light to the P-polarization light and outputs the P-polarization light of the white light. And, the projection type image display apparatus of the first embodiment uses as the light valve the reflection-type liquid crystal panel but may use a transmissive liquid crystal panel or a light valve other than the liquid crystal panel.

Figure 5A:
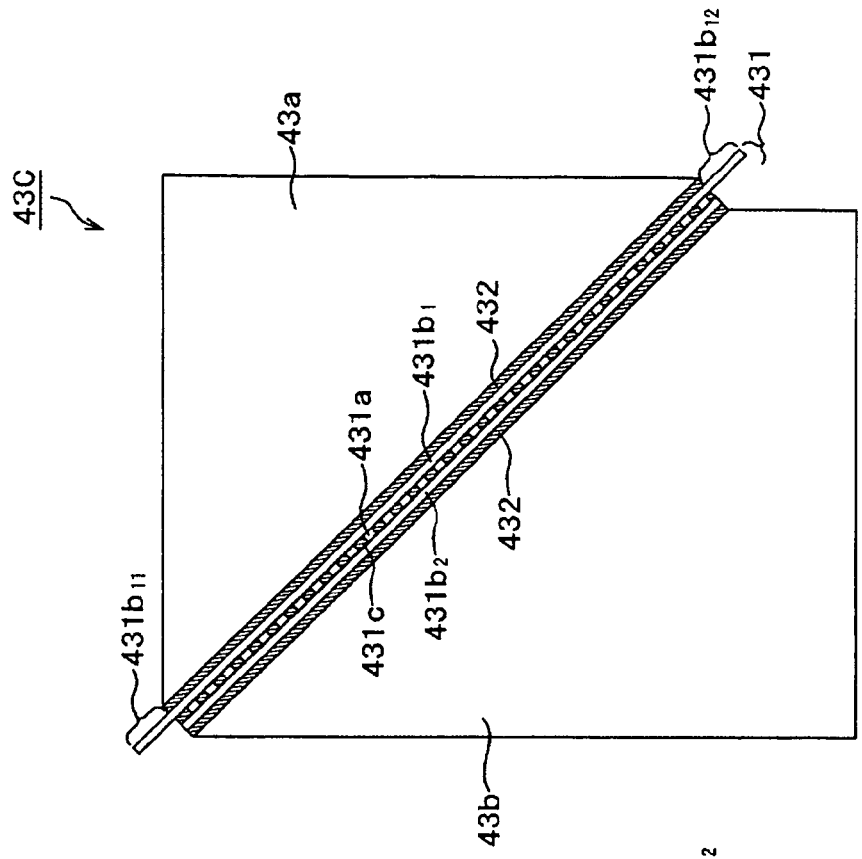
FIGS. 5A and 5B are diagrams showing second and third embodiments of the polarization splitting unit, respectively.
Figure 5B:
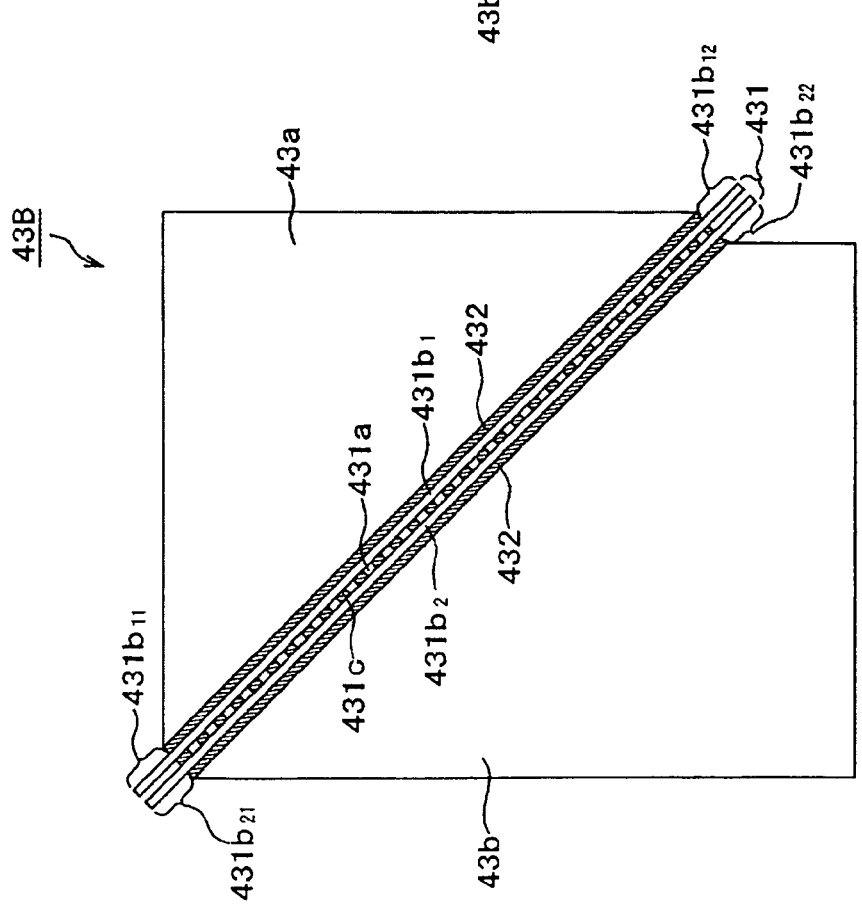

FIGS. 5A, 5B are diagrams showing second and third embodiments of the polarization splitting unit having a structure that performs polarization splitting of light by the diffraction based on the grid structure (the polarization splitting unit 43A of FIG. 2 is determined as the first embodiment of the blue light polarization splitting unit). These embodiments protrude the substrate of the polarization splitting layer externally (to outside) from the surfaces of the prism materials 43a, 43b. FIG. 5A is the second embodiment that two substrates $431b_1$, $431b_2$ of the polarization splitting layer are protruded externally (to outside), and FIG. 5B is the third embodiment that only the substrate $431b_1$ between the two substrates $431b_1$, $431b_2$ is protruded externally (to outside).

In FIG. 5A, 43B is a blue light polarization splitting unit, $431b_{11}$, $431b_{12}$ each are a portion of the substrate $431b_1$ protruded from the prism material 43a, and $431b_{21}$, $431b_{22}$ each are a portion of the substrate $431b_2$ protruded from the prism material 43b. Other reference numerals are same as those of FIG. 2. The substrate $431b_1$ and the substrate $431b_2$ each are protruded in a direction perpendicular to the sheet with respect to the prism materials 43a, 43b. As the substrates $431b_1$, $431b_2$, for example, a glass substrate, a quartz substrate, a sapphire substrate or a magnesia oxide (MgO) substrate is used. And, the medium 431c and the substrates $431b_1$, $431b_2$ are determined such that when the refractive index of the medium 431c is $n_1$ and the refractive index of the substrates $431b_1$, $431b_2$ is $n_2$, $\{(n_2-n_1)/(n_2+n_1)\}^2$ is in a range of, for example, 0.003 or less. If it is 0.001 or less, a more outstanding polarization splitting property can be obtained. By virtue of the structure of FIG. 5A, the parts protruded from the surfaces of the prism materials 43a, 43b can be exposed to cooling air, so that a cooling efficiency of the whole of the polarization splitting unit 43B and the polarization splitting layer 431 can be improved. The optically-transparent medium 431c may be filled between the protruded part $431b_{11}$ and the protruded part $431b_{12}$.

In FIG. 5B, 43C is a blue light polarization splitting unit, and other reference numerals are same as those in FIG. 5A. In this case, it is also assumed that as the substrates $431b_1$, $431b_2$, for example, a glass substrate, a quartz substrate, a sapphire substrate or a magnesia oxide (MgO) substrate is used. And, the medium 431c and the substrates $431b_1$, $431b_2$ are in a relationship such that when the refractive index of the medium 431c is $n_1$ and the refractive index of the substrates $431b_1$, $431b_2$ is $n_2$, $\{(n_2-n_1)/(n_2+n_1)\}^2$ satisfies, for example, 0.003 or less, and if the value is 0.001 or less, a more outstanding polarization splitting property can be obtained. By configuring as shown in FIG. 5B, the parts protruded from the prism material 43a can also be exposed to cooling air, so that a cooling efficiency of the whole of the polarization splitting unit 43C and the polarization splitting layer 431 can be improved.

Where the projection type image display apparatus has the polarization splitting section formed by using the polarization splitting units of FIGS. 5A, 5B, the reflection of light and astigmatism can also be suppressed, thereby bright and high-quality pictures can be obtained with an increase in unevenness in color and a decrease in contrast suppressed. And, as described above, the cooling efficiency of the whole of the polarization splitting unit and the polarization splitting layer can be improved.

By forming the parts protruded from the prism material 43a as shown in FIGS. 5A, 5B, an adverse effect due to a temperature increase of the polarization splitting section and the like can be prevented. In other words, if temperatures of the polarization splitting section and its surrounding parts increase, a stress is produced, and polarization characteristics are disturbed, resulting in deterioration of the polarization splitting property. But, such a phenomenon can be prevented.

Figure 6:
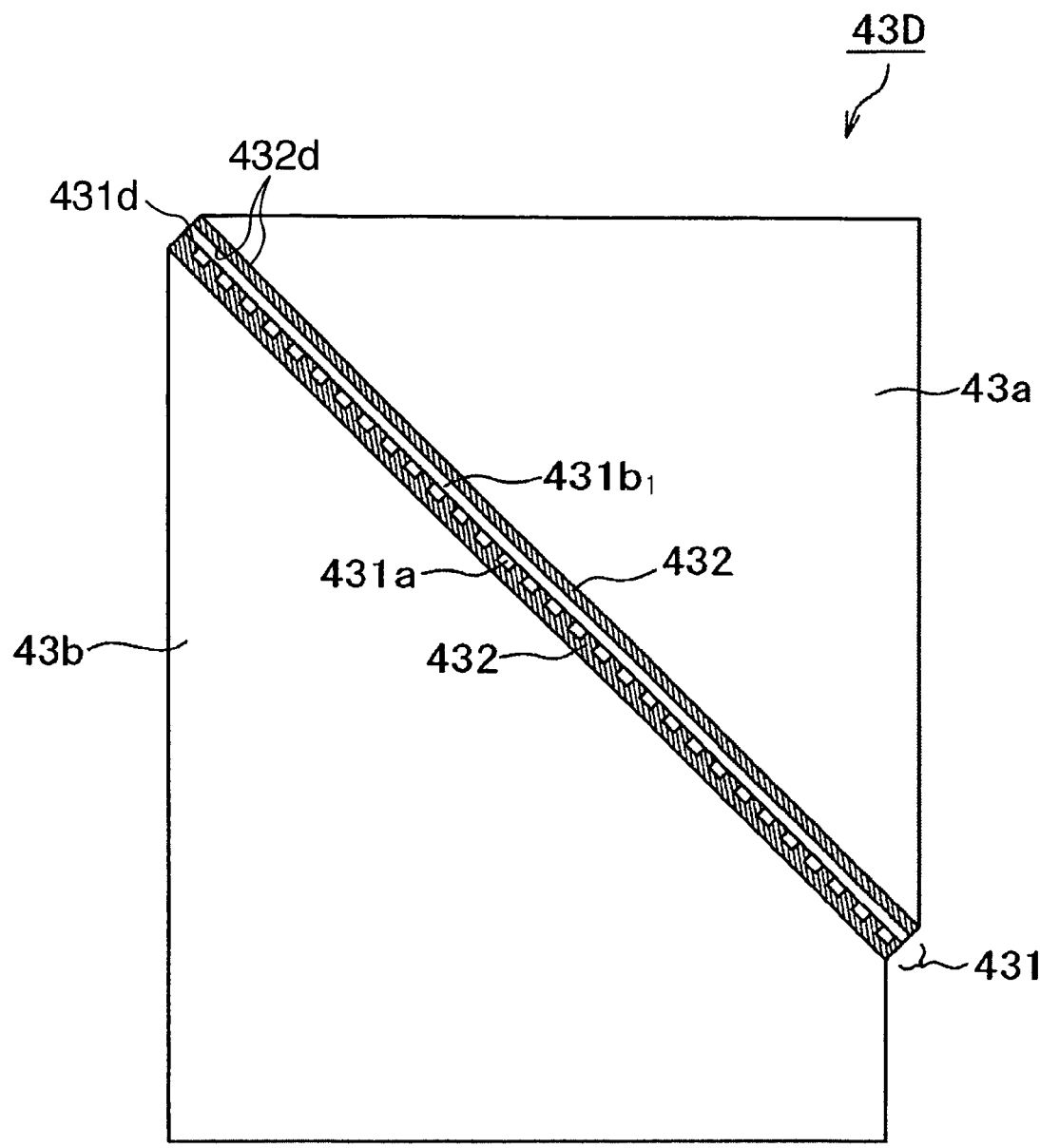
FIG. 6 is a diagram showing a fourth embodiment of the polarization splitting unit.

FIG. 6 is a diagram showing a fourth embodiment of the polarization splitting unit having a structure that performs polarization splitting of light by diffraction based on the grid structure. This embodiment is an example that a single substrate is used for the polarization splitting layer.

In FIG. 6, 43D is a blue light polarization splitting unit, and $431b_1$ is a single substrate forming the polarization splitting layer 431. Other reference numerals are same as in FIG. 5. According to the structure of this embodiment, the polarization splitting layer 431 is comprised of a light reflecting grid member 431a, a substrate $431b_1$ and a medium 432. In this case, as the substrate $431b_1$, for example, a glass substrate, a quartz substrate, a sapphire substrate or a magnesia oxide (MgO) substrate is also used. And, the medium 432 and the substrate $431b_1$ are in a relationship such that when the refractive index of the medium 432 is $n_1$ and the refractive index of the substrate $431b_1$ is $n_2$, $\{(n_2-n_1)/(n_2+n_1)\}^2$ satisfies, for example, 0.003 or less, and if the value is 0.001 or less, a more outstanding polarization splitting property can be obtained.

The refractive index of the adhesive or tackiness agents 431d, 432d of this embodiment may also have the same relationship as in the first embodiment.

The projection type image display apparatus having the polarization splitting section formed by using the polarization splitting unit of FIG. 6 can be suppress the reflection of light and astigmatism, thereby bright and high-quality pictures can be obtained with an increase in unevenness in color and a decrease in contrast suppressed.

FIGS. 7A, 7B are diagrams showing a fifth embodiment having a structure that performs polarization splitting of light by the diffraction based on the grid structure. This embodiment is an example that a single substrate is used for a polarization splitting layer and the substrate is protruded from the surfaces of prism materials. FIG. 7A is a plan view, and FIG. 7B is a perspective view.

In FIGS. 7A, 7B, 43E is a blue light polarization splitting unit, and $431b_{11}$ is a part of the substrate $431b_1$ protruded from the prism materials 43a, 43b. Other reference numerals are same as in FIGS. 5A, 5B and FIG. 6. In the structure of this embodiment, the polarization splitting layer 431 is comprised of the light reflecting grid member 431a, the substrate $431b_1$ and the medium 432. In this case, as the substrate 431b, for example, a glass substrate, a quartz substrate, a sapphire substrate or a magnesia oxide (MgO) substrate is also used. And, the medium 432 and the substrate $431b_1$ are in a relationship such that when the refractive index of the medium 432 is $n_1$ and the refractive index of the substrate $431b_1$ is $n_2$, $\{(n_2-n_1)/(n_2+n_1)\}^2$ satisfies, for example, 0.003 or less, and if the value is 0.001 or less, a more outstanding polarization splitting property can be obtained. By the structure shown in FIGS. 7A, 7B, the part $431b_{11}$ protruded from the prism materials 43a, 43b can be exposed to cooling air, so that a cooling efficiency of the whole of the polarization splitting unit 43E and the polarization splitting layer 431 can be improved in the same way as in the second and third embodiments.

The projection type image display apparatus which has the polarization splitting section formed by using the polarization splitting unit of FIGS. 7A, 7B can suppress reflection of light, astigmatism and the like, thereby bright and high-quality pictures can be obtained with an increase in unevenness in color and a decrease in contrast suppressed. And, as described above, the cooling efficiency of the whole of the polarization splitting unit 43E and the polarization splitting layer 431 can be improved.

In the structures of FIG. 5A through FIG. 7B and their descriptions, the polarization splitting unit which is used for the blue light polarization splitting section 43 has been described. Besides, the same is also applied to a case where the polarization splitting unit which is configured to perform polarization splitting of light by the diffraction based on the grid structure is used for both of the blue light polarization splitting section 43 and the green light polarization splitting section 42, and a case where the polarization splitting unit which is configured to perform polarization splitting of light by the diffraction based on the grid structure is used for all the polarization splitting sections of the blue light polarization splitting section 43, the green light polarization splitting section 42 and the red light polarization splitting section 41.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A projection type image display apparatus which modulates light from a light source by a light valve according to picture signals to form an optical image and to enlarge and project it, comprising:
   a polarization converting unit which aligns polarization directions of the light from the light source and forms P-polarization light or S-polarization light;
   color separators which separate the polarization light, which is undergone the polarization converting, into individual color lights of red, green and blue;
   three light valves to which the polarized lights of the separated individual color lights are emitted and which modulate the polarization lights of the individual colors according to picture signals and which are disposed in correspondence with the individual color lights;
   three polarization splitting sections which are disposed in correspondence with the individual color lights and perform polarization splitting of the light to be emitted to the corresponding light valve among the three light valves and the light modulated by the corresponding light valve;
   a color-synthesizing part which color-synthesizes the lights undergone the polarization splitting by the three polarization splitting sections;
   a projection lens unit which enlarges and projects the color-synthesized light beam; and
   a drive circuit which drives the light valves, wherein:
   each of the three polarization splitting sections is configured to dispose a polarization splitting layer for polarization splitting of light between a pair of prism materials with an adhesive agent or a tackiness agent which is formed of an optically-transparent medium interposed, and at least one of the three polarization splitting sections is configured to perform polarization splitting of light by diffraction based on a grid structure; and
   wherein the at least one polarization splitting section has a structure in that the polarization splitting layer is formed of a light reflecting grid member which is arranged in a grid-shaped pattern on an optically-transparent substrate, and an optically-transparent medium is filled between the grid member and the substrate in contact with the grid member surface and the substrate surface, and the grid member and the filled optically-transparent medium are bonded to the substrate with another adhesive agent or tackiness agent formed of an optically-transparent medium interposed.

2. The projection type image display apparatus according to claim 1, wherein the refractive index of the other adhesive agent or tackiness agent is substantially same as the refractive index of the grid member and the filled optically-transparent medium.

3. The projection type image display apparatus according to claim 1, wherein the polarization splitting section is configured to have both sides of the grid member sandwiched between the two optically-transparent substrates with the other adhesive agent or tackiness agent interposed.

4. The projection type image display apparatus according to claim 1, wherein when the refractive index of the filled optically-transparent medium is $n_1$ and the refractive index of the substrate is $n_2$, $\{(n_2-n_1)/(n_2+n_1)\}^2 \leq 0.003$ is satisfied.

5. A projection type image display apparatus which modulates light from a light source by a light valve according to picture signals to form an optical image and to enlarge and project it, comprising:
   polarization converting units which align polarization directions of light from the light source, and form P-polarization light or S-polarization light;
   color separators which separate the polarization light, which is undergone the polarization converting, into individual color lights of red, green and blue;
   three light valves to which the polarization lights of the separated individual color lights are emitted and which modulate the polarization lights of the individual colors according to picture signals and which are disposed in correspondence with the individual color lights;
   three polarization splitting sections which are disposed in correspondence with the individual color lights and perform polarization splitting of the light to be emitted to the corresponding light valve among the three light valves and the light modulated by the corresponding light valve;
   a color-synthesizing part which color-synthesizes the lights undergone the polarization splitting by the three polarization splitting sections;
   a projection lens unit which enlarges and projects the color-synthesized light beam; and
   a drive circuit which drives the light valve, wherein:
   each of the three polarization splitting sections is configured to dispose a polarization splitting layer for polarization splitting of light between a pair of prism materials with an adhesive agent or a tackiness agent which is formed of an optically-transparent medium interposed, and at least one of the three polarization splitting sections is configured to perform polarization splitting of light by diffraction based on a grid structure, and
   the polarization splitting layer is partly protruded externally from the surfaces of the prism materials.

6. The projection type image display apparatus according to claim 5, wherein in the at least one polarization splitting section, the polarization splitting layer is formed of a light reflecting grid member which is arranged in a grid-shaped pattern on an optically-transparent substrate, an optically-transparent medium is filled between the grid member and the substrate in contact with the grid member surface and the substrate surface, and the grid member and the filled optically-transparent medium are bonded to the substrate with another adhesive agent or tackiness agent formed of the optically-transparent medium interposed.

7. The projection type image display apparatus according to claim 6, wherein the refractive index of the other adhesive agent or tackiness agent is substantially same as the refractive index of the grid member and the filled optically-transparent medium.

8. The projection type image display apparatus according to claim 6, wherein the polarization splitting section has both sides of the grid member sandwiched between the two optically-transparent substrates with the other adhesive agent or tackiness agent interposed.

9. The projection type image display apparatus according to claim 6, wherein the substrate is externally protruded as a part of the polarization splitting layer from the surfaces of the prism materials.

10. The projection type image display apparatus according to claim 6, wherein the polarization splitting section which performs polarization splitting of the incident light has:
a pair of prism materials; and
a polarization splitting layer which is held between the pair of prism materials, and
the polarization splitting layer is formed of a light reflecting grid member which is arranged in a grid-shaped pattern on the optically-transparent substrate, the optically-transparent medium is filled between the grid member and the substrate in contact with the grid member surface and the substrate surface, and the grid member and the filled optically-transparent medium are bonded to the substrate with the adhesive agent or tackiness agent formed of an optically-transparent medium interposed.

11. The projection type image display apparatus according to claim 10, wherein the refractive index of the adhesive agent or tackiness agent is substantially same as the refractive index of the grid member and the filled optically-transparent medium.

12. The projection type image display apparatus according to claim 10, wherein the polarization splitting section has both sides of the grid member sandwiched by the two optically-transparent substrates with the adhesive agent or the tackiness agent interposed.

13. The projection type image display apparatus according to claim 10, wherein when it is assumed that the refractive index of the filled optically-transparent medium is $n_1$ and the refractive index of the substrate is $n_2$, $\{(n_2-n_1)/(n_2+n_1)\}^2 \leq 0.003$ is satisfied.

14. An optical unit for a projection type image display apparatus that performs polarization converting of light from a light source, emits to a light valve, forms an optical image by the light valve according to picture signals to enlarge and project it, comprising:
three polarization splitting sections which are disposed in correspondence with the individual color lights and perform polarization splitting of the light to be emitted to the corresponding light valve among the three light valves and the light modulated by the corresponding light valve;
a color-synthesizing part which color-synthesizes the lights undergone the polarization splitting by the three polarization splitting sections;
a projection lens unit which enlarges and projects the color-synthesized light beam; and
a drive circuit which drives the light valves, wherein:
each of the three polarization splitting sections is configured to dispose a polarization splitting layer for polarization splitting of light between a pair of prism materials with an adhesive agent or a tackiness agent which is formed of an optically-transparent medium interposed, and at least one of the three polarization splitting sections is configured to perform polarization splitting of light by diffraction based on a grid structure; and
wherein the at least one polarization splitting section has a structure in that the polarization splitting layer is formed of a light reflecting grid member which is arranged in a grid-shaped pattern on an optically-transparent substrate, and an optically-transparent medium is filled between the grid member and the substrate in contact with the grid member surface and the substrate surface, and the grid member and the filled optically-transparent medium are bonded to the substrate with another adhesive agent or tackiness agent formed of an optically-transparent medium interposed.

15. The projection type image display apparatus according to claim 14, wherein the refractive index of the other adhesive agent or tackiness agent is substantially same as the refractive index of the grid member and the filled optically-transparent medium.

16. The projection type image display apparatus according to claim 14, wherein the polarization splitting section is configured to have both sides of the grid member sandwiched between the two optically-transparent substrates with the other adhesive agent or tackiness agent interposed.

17. The projection type image display apparatus according to claim 14, wherein when the refractive index of the filled optically-transparent medium is $n_1$ and the refractive index of the substrate is $n_2$, $\{(n_2-n_1)/(n_{2+n1})\}^2 \leq 0.003$ is satisfied.

\* \* \* \* \*